United States Patent

Walston et al.

(10) Patent No.: US 11,871,453 B2
(45) Date of Patent: Jan. 9, 2024

(54) INGRESS NOISE MITIGATION ON CHANNELS IMPLEMENTED IN A NETWORK

(71) Applicant: ARRIS Enterprises LLC, Suwanee, GA (US)

(72) Inventors: Robert Allen Walston, Atlanta, GA (US); Jonathan W. Guo, Atlanta, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 303 days.

(21) Appl. No.: 17/462,360

(22) Filed: Aug. 31, 2021

(65) Prior Publication Data

US 2022/0070937 A1    Mar. 3, 2022

Related U.S. Application Data

(60) Provisional application No. 63/073,685, filed on Sep. 2, 2020.

(51) Int. Cl.
| | | |
|---|---|---|
| *H04W 74/08* | (2009.01) | |
| *H04W 36/20* | (2009.01) | |
| *H04W 48/02* | (2009.01) | |
| *H04W 72/0453* | (2023.01) | |

(52) U.S. Cl.
CPC ....... *H04W 74/0816* (2013.01); *H04W 36/20* (2013.01); *H04W 48/02* (2013.01); *H04W 72/0453* (2013.01)

(58) Field of Classification Search
CPC . H04W 74/0816; H04W 36/20; H04W 48/02; H04W 72/0453; H04H 60/43; H04H 20/12
See application file for complete search history.

(56) References Cited

U.S. PATENT DOCUMENTS

| | | | |
|---|---|---|---|
| 6,570,913 B1 * | 5/2003 | Chen | H04H 60/97 725/64 |
| 6,606,351 B1 | 8/2003 | Dapper et al. | |
| 2016/0323168 A1 | 11/2016 | Leach et al. | |
| 2017/0006557 A1 * | 1/2017 | Liu | H04W 28/0221 |

OTHER PUBLICATIONS

Sirojiddin et al., Channel hopping scheme to mitigate jamming attacks in wireless LANs, p. 2 (Year: 2017).*
International Preliminary Report on Patentability dated Mar. 7, 2023 in corresponding International (PCT) Patent Application No. PCT/US2021/048341.
International Search Report and the Written Opinion of the International Searching Authority dated Dec. 7, 2021 in International Application No. PCT/US2021/048341.

* cited by examiner

*Primary Examiner* — Ashley Shivers
(74) *Attorney, Agent, or Firm* — Wenderoth, Lind & Ponack, L.L.P.

(57) ABSTRACT

An electronic device, method, and computer-readable recording medium track the number of times a device loses lock on a first channel. Under a condition that the device loses lock or regains lock on the first channel a predetermined number of times over a time period, the electronic device, method, and computer-readable recording medium abandon the first channel and reinitialize to select a second channel.

11 Claims, 4 Drawing Sheets

US 11,871,453 B2

INGRESS NOISE MITIGATION ON CHANNELS IMPLEMENTED IN A NETWORK

TECHNICAL FIELD

The subject matter of the present disclosure relates generally to noise mitigation in a network.

BACKGROUND

Various networks include modems or devices such as gateways or access points (APs) that include modems or modem functions. The modem can select one channel to be the primary channel, and can add a number of secondary channels via channel bonding. Additionally, in some networks, a remote device can select one channel to be the primary channel for communication with, for example, central office equipment.

However, in the presence of certain types of ingress noise, the primary channel can be impaired enough to suffer packet loss but not so impaired to declare it unusable and requiring the selection of a different primary channel. This condition can manifests itself as "bouncing lock" on the channel. In some protocols, if a remote device loses lock on a channel but quickly recovers it (e.g., as in the condition that lock is bouncing), then it might try to keep using the channel. This condition can result in the undesirable effect of the remote device remaining on a very noisy channel.

Thus, it would be advantageous and an improvement over the relevant technology to provide improved ingress noise mitigation on channels implemented in various types of networks.

SUMMARY

An aspect of the present disclosure provides an electronic device capable of ingress noise mitigation on channels in a network. The electronic device comprises a non-transitory memory having instructions stored thereon, and a hardware processor configured to execute the instructions to: track the number of times a device loses lock on a first channel; and under a condition that the device loses lock or regains lock on the first channel a predetermined number of times over a time period, abandons the first channel and reinitializes to select a second channel.

The hardware processor is further configured to execute the instructions to remove the first channel from a frequency cache and/or add the first channel to a blacklist to avoid being used again.

An aspect of the present disclosure provides a method for ingress noise mitigation on channels in a network. The method comprises tracking, using an electronic device, a number of times a device loses lock on a first channel; and under a condition that the device loses lock or regains lock on the first channel a predetermined number of times over a time period, abandoning the first channel and reinitializing to select a second channel.

An aspect of the present disclosure provides a non-transitory computer-readable recording medium capable of ingress noise mitigation on channels in a network. The non-transitory computer-readable recording medium stores instructions which when executed by a hardware processor performs the steps of the method described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
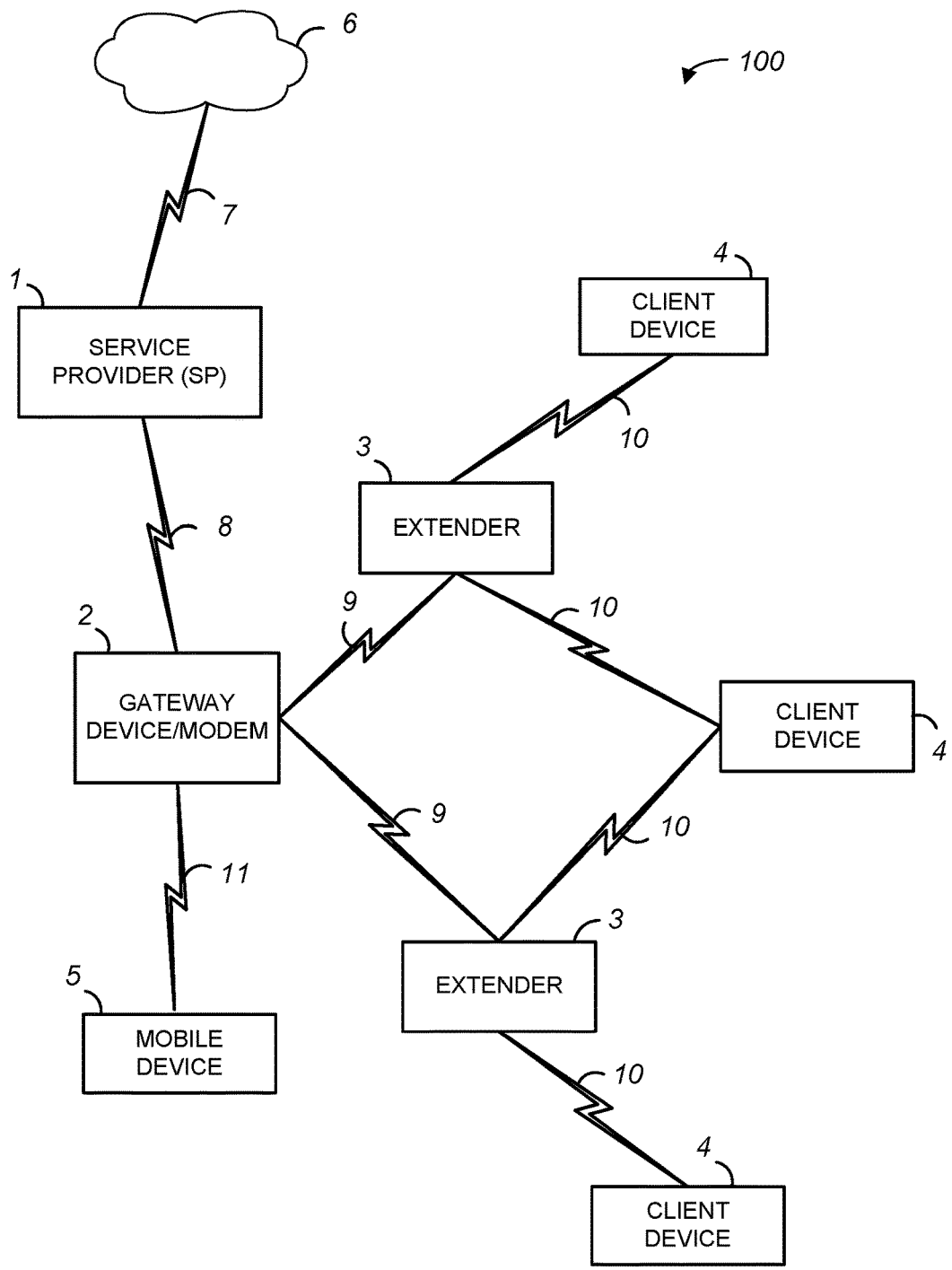
FIG. 1 is a schematic diagram illustrating an exemplary system according to an embodiment of the present disclosure.

FIG. 1 is a schematic diagram of an exemplary system 100 according to an embodiment of the present disclosure. As shown in FIG. 1, the main elements of the system 100 include a gateway device/modem 2 connected to the Internet 6 via a Service Provider (SP) 1 and also connected to different wireless devices such as Wi-Fi extenders 3, client devices 4, and a mobile device 5.

The system 100 shown in FIG. 1 includes wireless devices (e.g., extenders 3, client devices 4, and mobile device 5) that may be connected in one or more wireless networks (e.g., private, guest, iControl, backhaul network, or Internet of things (IoT) networks) within the system 100. Additionally, there could be some overlap between devices in the different networks. That is, one or more network devices could be located in more than one network. For example, wireless extenders 3 could be located both in a private network for providing content and information to a client device and also included in a backhaul network.

In FIG. 1, the SP 1 can be, for example, a streaming video provider or any computer for connecting the gateway device/modem 2 to the Internet 6. The connection 7 between the Internet 6 and the SP 1 and the connection 8 between the SP 1 and the gateway device/modem 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 8 can further include as some portion thereof a broadband mobile phone network connection, an optical network connection, or other similar connections. For example, the connection 8 can also be implemented using a fixed wireless connection that operates in accordance with, but is not limited to, 3rd Generation Partnership Project (3GPP) Long Term Evolution (LTE) or 5G protocols.

The gateway device/modem 2 is a hardware electronic device that performs the function of a stand-alone cable modem or a combination modem and gateway device that combines the functions of a modem, access point, and/or a router for providing received content to network devices (e.g., client devices 4, wireless extenders 3 and mobile device 5) in the system 100. It is also contemplated by the present disclosure that the gateway device/modem 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device/modem 2 is connected to the wireless extenders 3 via connection 9. The connection 9 between the gateway device/modem 2 and the wireless extenders 3 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands.

Additionally, the connection 9 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 9 can include connections to a media over coax (MoCA) network. One or more of the connections 9 can also be a wired Ethernet connection.

The wireless extenders 3 can be, for example, hardware electronic devices such as access points used to extend the wireless network by receiving the signals transmitted by the gateway device/modem 2 and rebroadcasting the signals to, for example, client devices 4, which may be out of range of the gateway device/modem 2. The wireless extenders 3 can also receive signals from the client devices 4 and rebroadcast the signals to the gateway device/modem 2 or other client devices 4.

The connection 10 between the wireless extenders 3 and the client devices 4 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 10 may be implemented using a wireless connection that operates in accordance with, but is not limited to, RF4CE protocol, ZigBee protocol, Z-Wave protocol, or IEEE 802.15.4 protocol. Also, one or more of the connections 10 can also be a wired Ethernet connection.

The client devices 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device/modem 2. Additionally, the client devices 4 can be a TV, an IP/QAM STB or an SMD that is capable of decoding audio/video content, and playing over OTT or MSO provided content received through the gateway device/modem 2.

The connection 11 between the gateway device/modem 2 and the mobile device 5 may be implemented through a wireless connection that operates in accordance with, but is not limited to, IEEE 802.11 protocol. The connection 11 may also be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, 6 GHz bands, or 60 GHz bands. The connection 11 between the gateway device/modem 2 and the mobile device 5 may also be implemented through a WAN, a LAN, a VPN, MANs, WLANs, SANs, a DOCSIS network, a fiber optics network (such as FTTH, FTTX, or HFC), a PSDN, a global Telex network, or a 2G, 3G, 4G or 5G network, for example. The connection 11 can also be a wired Ethernet connection.

The mobile device 5 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnect with other devices via Wi-Fi and Bluetooth protocols. Additionally, the mobile device 5 may be used by an operator of the system 100.

Figure 3:
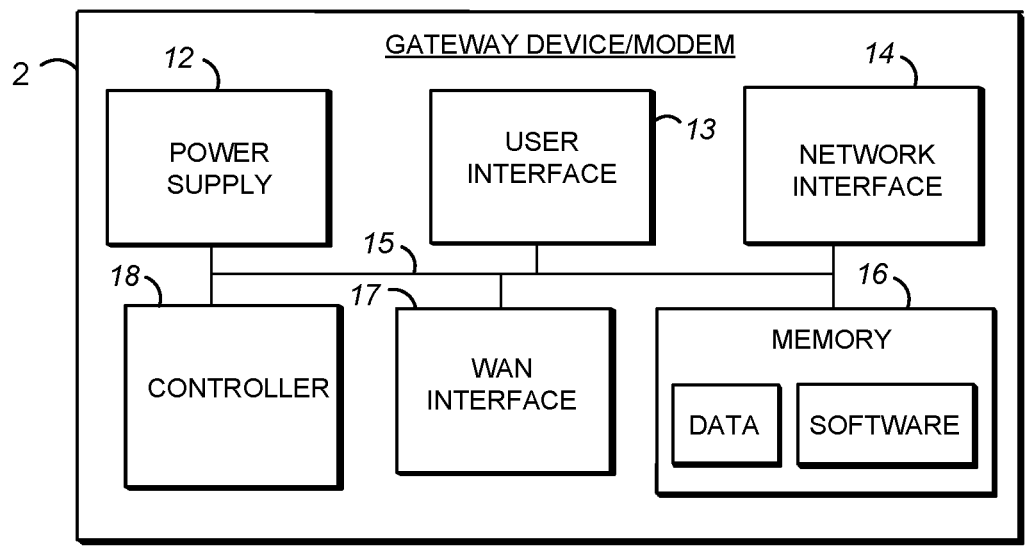
FIG. 3 is a more detailed schematic diagram illustrating an exemplary gateway device/modem according to an embodiment of the present disclosure.

A detailed description of the example internal components of the gateway device/modem 2 shown in FIG. 1 will be provided in the discussion of FIG. 3. However, in general, it is contemplated by the present disclosure that the gateway device/modem 2 includes electronic components or electronic computing devices operable to receive, transmit, process, store, and/or manage data and information associated with the system 100, which encompasses any suitable processing device adapted to perform computing tasks consistent with the execution of computer-readable instructions stored in a memory or a computer-readable recording medium.

Further, any, all, or some of the computing devices in the gateway device/modem 2 may be adapted to execute any operating system, including Linux, UNIX, Windows, MacOS, DOS, and ChromeOS as well as virtual machines adapted to virtualize execution of a particular operating system, including customized and proprietary operating systems. The gateway device/modem 2 is further equipped with components to facilitate communication with other computing devices over the one or more network connections to local and wide area networks, wireless and wired networks, public and private networks, and any other communication network enabling communication in the system 100.

The respective connections 7, 8 between the SP 1 and the Internet 5 and between the SP 1 and the gateway device/modem 2 shown in FIG. 1 are meant to be exemplary connections and are not meant to indicate all possible connections between the SP 1, gateway device/modem 2, and the Internet 5. Additionally, the connections 9 between the gateway device/modem 2 and the wireless extenders 3 shown in FIG. 1 are meant to be exemplary connections and are not meant to indicate all possible connections between the gateway device/modem 2 and the wireless extenders 3. The connections 10 between the extenders 3 and the client devices 4 shown in FIG. 1 are meant to be exemplary connections and are not meant to indicate all possible connections between the wireless extenders 3 and client devices 4.

Similarly, the connection 11 between the gateway device/ modem 2 and the mobile device 5 shown in FIG. 1 is meant to be an exemplary connection and not meant to indicate all possible connections between the gateway device/modem 2 and the mobile device 5. Moreover, it is contemplated by the present disclosure that the number of SPs 1, gateway devices/modems 2, wireless extenders 3, client devices 4, and mobile devices 5 is not limited to the number of SPs 1, gateway devices/modems 2, wireless extenders 3, client devices 4, and mobile devices 5 shown in FIG. 1.

Figure 2:
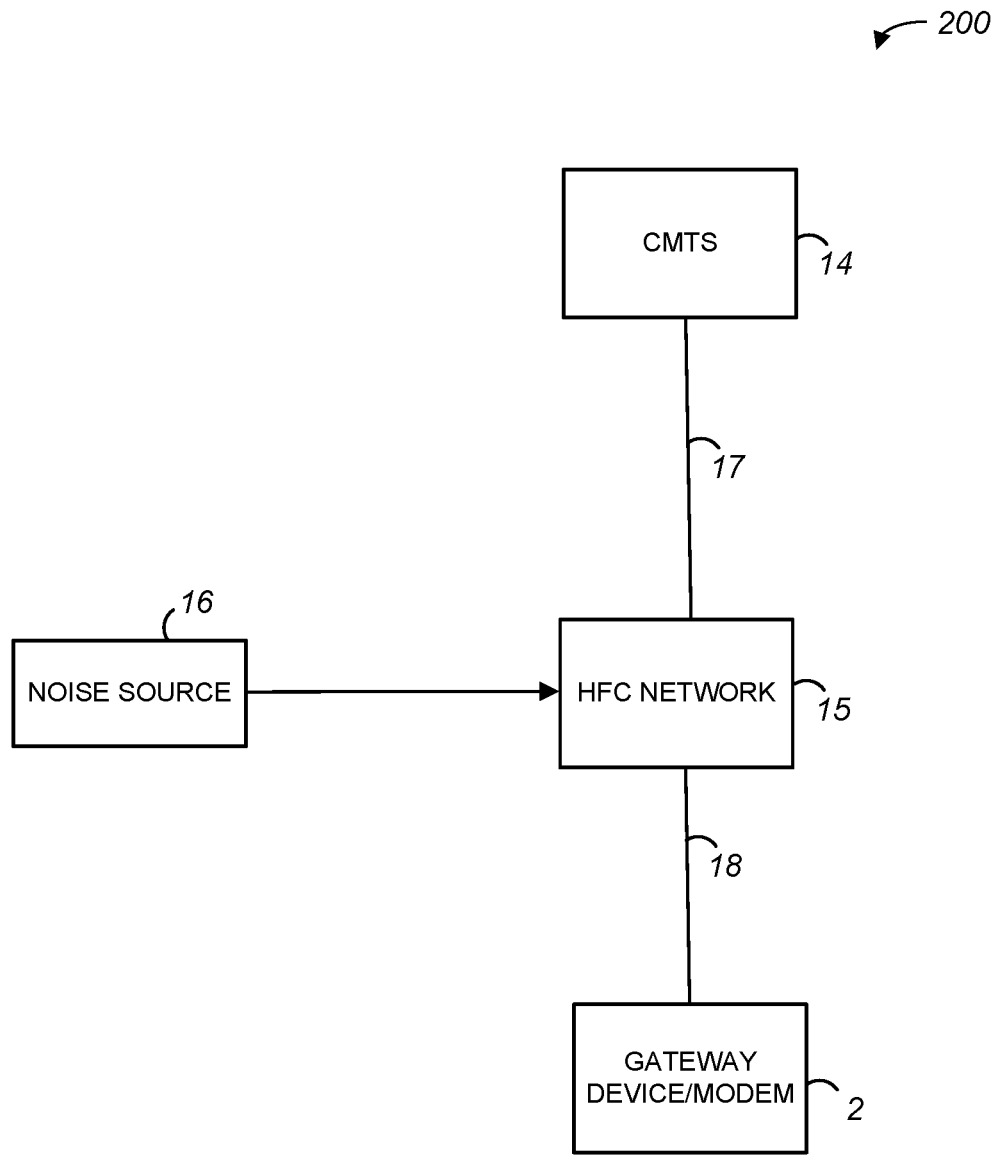
FIG. 2 is a schematic diagram illustrating another exemplary system according to an embodiment of the present disclosure.

FIG. 2 is a schematic diagram of an exemplary system 200 according to an embodiment of the present disclosure. FIG. 2 illustrates, for example, a DOCSIS network with a generic noise source adding interference to one or more channels utilized in the system. As shown in FIG. 2, the main elements of the system 200 include a gateway device/ modem 2, a hybrid fiber-coaxial network (HFC) network 15, a cable modem termination system (CMTS) 14, and a noise source 16. The gateway device/modem 2 is a hardware electronic device that performs the function of a stand-alone cable modem or a combination modem and gateway device that combines the functions of a modem, access point, and/or a router. The HFC network 15 is a network that combines the use of both optical fiber and coaxial cable.

The CMTS 14 is, for example, a device or piece of equipment located in a headend or hubsite of the service provider 1, which is used to provide high speed data services, such as cable Internet or Voice over Internet Protocol, to cable subscribers. The noise source 16 represents, for example, any type of ingress noise that can impair one or more channels (e.g., primary or secondary channels) implemented in the system 200, which can result in packet loss on the one or more channels. The connections 17 between the CMTS 14 and the HFC network 15, and the connection 18 between the HFC network 15 and the gateway device/modem 2 include wired or wireless connections as described, for example, with reference to FIG. 1.

FIG. 3 illustrates a more detailed schematic diagram of an exemplary gateway device/modem 2 implemented in the system 100, 200 for ingress noise mitigation on channels in a network according to an embodiment of the present disclosure.

The gateway device/modem 2 is a hardware electronic device that performs the function of a stand-alone cable modem or a combination modem and gateway device that combines the functions of a modem, access point and/or a router for providing received content to network devices (e.g., client devices 4, wireless extenders 3, and mobile device 5) in the system 100. It is also contemplated by the present disclosure that the gateway device 2 can include the function of, but is not limited to, an IP/QAM STB or SMD that is capable of decoding audio/video content, and playing OTT or MSO provided content.

As shown in FIG. 2, the gateway device 2 includes a power supply 12, user interface 13, a network interface 14, a memory 16, a WAN interface 17 and a controller 18. The power supply 12 supplies power to the internal components of the gateway device 2 through the internal bus 15. The power supply 12 can be a self-contained power source such as a battery pack with an interface to be powered through an electrical charger connected to an outlet (e.g., either directly or by way of another device).

The user interface 13 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 2.

The network interface 14 includes various network cards, and circuitry implemented in software and/or hardware to enable communications using the communication protocols of the connections 8, 9, 10, 11, 18 in the system 100, 200 (e.g., as previously described with reference to FIGS. 1 and 2).

The memory 16 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 16 can be used to store any type of data, including, but not limited to, predetermined time periods or thresholds for tracking a number of times a device loses lock or regains lock to one or more channels. Additionally, the memory 16 can be used to store any type of instructions and/or software associated with algorithms, processes, or operations for performing ingress noise mitigation on channels in a network according to an embodiment of the present disclosure and for controlling the general functions and operations of the gateway device/modem 2.

The WAN interface 17 may include various network cards and circuitry implemented in software and/or hardware to enable communications between the gateway device 2 and the Internet 6 via the SP 1 using communications protocols in accordance with connection 7, 8, 17 in the system 100, 200 (e.g., as previously described with reference to FIGS. 1 and 2).

The controller 18 controls the general operations of the gateway device 2 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 2. Communication between the components (e.g., 12-14 and 16-18) of the gateway device 2 is established using the internal bus 15.

Figure 4:
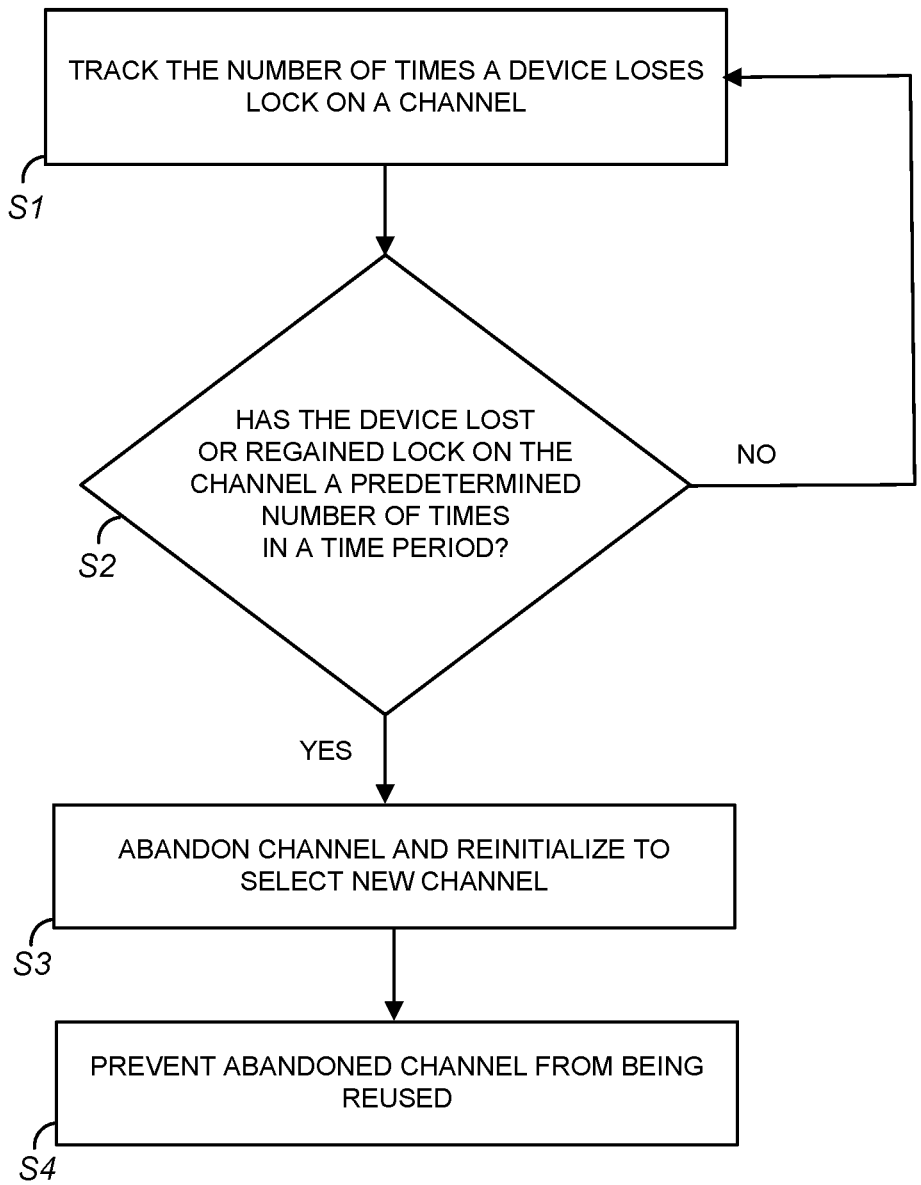
FIG. 4 is an exemplary method and algorithm according to an embodiment of the present disclosure.

FIG. 4 is an exemplary method and algorithm for ingress noise mitigation on one or more channels in the system 100, 200 in accordance with an embodiment of the present disclosure. The exemplary method and algorithm of FIG. 4 includes operations that are performed, for example, by the software executed by the controller 18 of the gateway device/modem 2.

In step S1, the software executed by the controller 18 causes the gateway device/modem 2 to track the number of times a device in the system 100, 200 loses lock on a channel (e.g., a primary channel or other channel). For example, the gateway device/modem 2 can maintain a rolling clock (e.g. lose lock 5 times in any 10 second period, trigger the recovery). In step S2, if it is determined that the device has lost lock or regained lock on the channel a predetermined number of times (e.g., 5 times, 10 times, 20 times, etc.) in a time period (e.g., a number of seconds or a number of minutes), the gateway device/modem 2 abandons use of the channel and reinitializes to select a new or alternate channel (e.g., a new primary channel or a secondary channel) in step S3.

In step S4, the gateway device/modem 2 can take steps to assure that the abandoned channel is not used again. For example, it could remove the current downstream channel from its frequency cache to prevent it from immediately trying to recover using that same noisy channel. It also can put the noisy channel on a temporary black list to ensure that it doesn't try to use that same channel again during recovery.

In step S2, if it is determined that the device has not lost lock or regained lock on the channel a predetermined number of times in a time period, the gateway device/modem 2 with continue to track the number of times a devices in the system 100, 200 loses lock on a channel (e.g., a primary channel or other channel), as in step S1.

In the presence of certain types of ingress noise, the primary channel can be impaired enough to suffer data loss but not so impaired as to declare it unusable and select a different primary channel. In some cases this can manifest itself as "bouncing lock" on that primary channel. In some protocols if the remote device loses lock on a channel but quickly recovers it (as happens when lock is bouncing), then it might try to keep using it, which has the undesired side effect of staying on a very noisy channel.

The apparatus, method and algorithm of the present disclosure keeps track of how many times the remote device loses lock on a channel (e.g., primary channel or other channel). If the device loses and regains lock X times in Y seconds, the apparatus, method and algorithm of the present disclosure will abandon that channel and perform a reinitialization to select a new channel (e.g., new primary channel or secondary channel). Furthermore, the apparatus, method and algorithm of the present disclosure could remove the current downstream channel from its frequency cache to prevent it from immediately trying to recover using that same noisy channel. It also could put that noisy channel on a temporary black list to ensure that it doesn't try to use that same channel again during recovery.

One embodiment of the present disclosure, the apparatus, method and algorithm can be implemented in a DOCSIS network, where the remote device is a cable modem or cable gateway. In that case, the reinitialization could be a reinit-MAC. Also there may or may not be secondary communication channels that the modem uses in addition to the primary channel.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 4. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device capable of ingress noise mitigation on channels in a network, the electronic device comprising:
   a non-transitory memory having instructions stored thereon; and
   a hardware processor configured to execute the instructions to:
   track a number of times a device loses lock on a first channel; and
   under a condition that the device loses lock or regains lock on the first channel a predetermined number of times over a time period, abandon the first channel and reinitialize to select a second channel.

2. The electronic device according to claim 1, wherein the hardware processor further executes the instructions to remove the first channel from a frequency cache.

3. The electronic device according to claim 1, wherein the hardware processor further executes the instructions to add the first channel to a black list.

4. The electronic device according to claim 1, wherein the electronic device is a cable modem or gateway device including a cable modem.

5. The electronic device according to claim 1, wherein the first channel is a primary channel and the second channel is a secondary channel or a new primary channel.

6. A method for ingress noise mitigation on channels in a network, the method comprising:
tracking, using an electronic device, a number of times a device loses lock on a first channel; and
under a condition that the device loses lock or regains lock on the first channel a predetermined number of times over a time period, abandoning the first channel and reinitializing to select a second channel.

7. The method according to claim 6, further comprising removing the first channel from a frequency cache.

8. The method according to claim 6, further comprising adding the first channel to a black list.

9. A non-transitory computer-readable recording medium in a first electronic device for ingress noise mitigation on channels in a network, the non-transitory computer-readable recording medium storing instructions which when executed by a hardware processor cause the non-transitory recording medium to perform steps comprising:
tracking a number of times a device loses lock on a first channel; and
under a condition that the device loses lock or regains lock on the first channel a predetermined number of times over a time period, abandoning the first channel and reinitializing to select a second channel.

10. The non-transitory computer-readable recording medium according to claim 9, further comprising removing the first channel from a frequency cache.

11. The non-transitory computer-readable recording medium according to claim 9, further comprising adding the first channel to a black list.

* * * * *